United States Patent [19]

Singh

[11] Patent Number: 4,824,263

[45] Date of Patent: Apr. 25, 1989

[54] THRUST BEARING SHOES

[75] Inventor: Anant P. Singh, Olean, N.Y.

[73] Assignee: Dresser Industries, Inc., Dallas, Tex.

[21] Appl. No.: 793,719

[22] Filed: Oct. 30, 1985

Related U.S. Application Data

[63] Continuation of Ser. No. 568,953, Jan. 6, 1984, abandoned, which is a continuation of Ser. No. 368,778, Apr. 15, 1983, abandoned.

[51] Int. Cl.$^4$ .............................................. F16C 17/06
[52] U.S. Cl. .................................................. 384/306
[58] Field of Search ............... 384/117, 118, 122, 123, 384/305–312

[56] References Cited

U.S. PATENT DOCUMENTS 3,702,719 11/1972 Hoffman ............................. 384/306
4,103,979 8/1978 Kuhn .................................... 384/306

OTHER PUBLICATIONS

Lord Rayleigh, "Notes on the Theory of Lubrication", Philosophic Magazine and Journal of Sciences, vol. 53, 1918, pp. 2–6.
Martin, H. M., "Theory of Michell Thrust Bearing", Engineering vol. 109, 1920, pp. 233–236.
Fuller, D. D., "Theory and Practice of Lubrication for Engineers", Wiley, N.Y., 1956, pp. 154–159; 166–178; 183–185.

Primary Examiner—David Werner
Attorney, Agent, or Firm—Sigalos, Levine & Montgomery

[57] ABSTRACT

An improved thrust bearing shoe and method for making same is provided. The bearing shoe includes a surface having an optimum one-dimensional curved profile maximized as to load carrying capacity in accordance with predetermined relationships for the dimensions of the shoe. The curved profile may be cycloidal, truncated cycloidal, cubic or quadratic in shape depending on the dimensions of the shoe.

9 Claims, 6 Drawing Sheets

THRUST BEARING SHOES

This application is a continuation of application Ser. No. 568,953, filed Jan. 6, 1984, now abandoned, which is a continuation of application Ser. No. 368,778, filed Apr. 15, 1983, now abandoned.

TECHNICAL FIELD

The present invention relates to thrust bearings, and more particularly to pivoted shoe thrust bearings having optimally curved one-dimensional profiles.

BACKGROUND ART

Pivoted shoe thrust bearings have long been used in high speed applications or where low friction losses and low wear rates are essential. An example of such a bearing is the Kingsbury thrust bearing, or Michell bearing in Europe, where the bearing members are pivotable shoes which rest on hard steel pivots in a bearing housing. The shoes are free to automatically form a wedge-shaped oil film between the shoe surface and the moving thrust collar. The thrust collar transmits the thrust force through the hydrodynamic oil film to the pivoted shoes. In the prior art bearing, a base ring supports the shoes and equalizes the shoe loading. A housing is provided to contain and support the internal bearing elements. A shoe cage restrains the shoes against movement with the thrust collar, but not against outward displacement. The thrust load of the bearing is finally transmitted to a machine frame connected to the housing.

The conventional pivoted shoe thrust bearing also includes a lubricating system which continuously supplies the thrust collar and shoes with lubricating oil. In some applications, a cooling system is provided to reduce the temperature rise in the bearing.

Prior art pivoted shoes have had a flat surface on one side and a pivoting mechanism on the other side. One such pivoting mechanism in the prior art is the convex surface with an offset center of radius of curvature which provides line contact with a supporting surface. Another prior art method of pivoting is the point contact system, where the shoe has a hardened insert in the back which allows the shoe to pivot slightly. If the location of the pivot coincides with the geometrical center of the shoe, it becomes a centrally pivoted thrust bearing. Centrally pivoted bearings are useful in marine and other applications where reversibility is required.

The pivoted shoe in its pivoted position creates a tapered oil film between the shoe and the thrust collar. The oil film provides hydrodynamic pressure and load carrying capacity. The maximum load carrying capacity of the bearing is dependent on the inclination of the shoe and the location of the pivot point on the back of the shoe. The inclination of the shoe is usually designated by the symbol $\alpha$, which represents the ratio of the maximum film thickness $h_1$ to a minimum film thickness $h_0$.

Earlier investigations on fixed, as opposed to pivoted, shoe bearings [References 1-4] provided optimum values of $\alpha$ required for maximum load carrying capacity for a few oil film shapes such as taper, step, exponential and polynomial by solving a one dimensional Reynolds equation. The conclusions drawn on the basis of one dimensional analysis [Reference 3] underestimated the importance of film shape effect on the performance characteristics of fixed shoe bearings. The design variable $\alpha$ for a fixed shoe bearing is not of much practical value for a practicing engineer in industry as it is a function of minimum film thickness, which is controlled by the load. Therefore, fixed shoe bearings cannot be designed for these optimum values of $\alpha$, unless the load is strictly fixed, and this limits the applications of such a design.

To overcome this problem, the pivoted shoe bearing, with a flat surface, became the subject of basic developments in hydrodynamic lubrication of bearings. In the case of pivoted shoe bearings, the maximum to minimum film thickness ratio $\alpha$, is controlled by the location of pivot position and is independent of the minimum film thickness. This feature of a pivoted shoe bearing is the basic cause of its increasing popularity in the field of thrust and even journal bearings.

One dimensional flow solutions were modified by using correction factors to account for the effect of side leakage in finite bearings [References 5-7]. These correction factors were determined experimentally [References 5, 6]. Computer-aided finite difference solutions of a two dimensional Reynolds equation provided performance charts to analyze pivoted shoe bearings with flat surfaces [References 8-11]. The load carrying capacity of pivoted shoe thrust bearings has also been studied with reference to a few convex surface profiles [References 12-14].

Optimum solutions to many physical problems, such as the optimum path of a particle in motion, the optimum profile for sound traveling through horns [Reference 15], and the optimum shape profile for concentrators used in ultrasonic machining [Reference 16], have yielded cycloidal and catenoidal surface profiles. Although excellent performance based on one dimensional flow analysis of discontinuous oil film shape caused by a step profile provided enough incentive to researchers for the extension of related research in the past [References 17-21], the present invention is directed towards one dimensional continuous surface profiles.

Exact solutions are known to the Reynolds equation for two dimensional flow for continuous fluid film shapes with simple functions only [References 7, 22-25] and fail to demonstrate the fact that optimum $\alpha$ values required for the maximum load carrying capacity have different values for infinitely wide and/or narrow bearings. Historically, the first computer method of solving bearing problems was Kingsbury's electrolytic tank method [Reference 26]. A mechanical differential analyzer has also been employed in an attempt to include the actual temperature distribution in the oil film [Reference 27]. The inadequacy of the solutions obtained by these methods has led to finite difference methods.

Various relaxation schemes have been used to accomplish numerical solutions for hydrodynamic thrust bearings by Archibald [Reference 17] and Christopherson [Reference 27] and for the stepped thrust bearings by Kettleborough [Reference 18]. An improved method by using matrix subroutines instead of relaxation schemes for the numerical solution of the general incompressible fluid film lubrication problem was presented by Castelli and Shapiro [Reference 28].

The solution of the Reynolds equation for imcompressible fluids has been obtained by the formulation of coefficient matrices and then using inversion subroutines [References 4, 29]. The use of new methods [Reference 30] to find nodal pressure without inverting any matrix is also known.

In recent years, several papers have been published using finite element methods for solving the Reynolds equation for different types of bearings [References 19-21, 31-34]. Other than complexities involved in the formulations of the two methods, namely finite difference and finite element techniques, two major factors always have to be considered. These are accuracy of the results and computer time involved. The use of variable dx and dz for different nodes by using higher order finite difference forms and new computer aided finite difference design schemes enlarge the scope of possible applications of finite difference method.

Load carrying capacity for centrally pivoted shoe bearings in practice has puzzled persons skilled in the art for many years, and explanations such as variable viscosity, variable density, viscosity changing with pressure and momentum effect at inlet were among the most usually offered theories [Reference 35-38]. Realizing the importance of surface profile, Raimondi and Boyd in their work [Reference 37] assumed an existence of a convex surface profile caused by manufacturing operations, temperature rise and operating load, and emphasized this as the most important factor accounting for the observed load carrying capacity of centrally pivoted shoes.

Raimondi and Boyd [Reference 37] and Abramovitz [Reference 12] both independently explained the working of the centrally pivoted bearing by assuming a convex surface profile and therefore an existence of a converging, diverging film shape in which the inactive diverging portion of the fluid film is utilized in switching the resultant pressure toward the center of the shoe length.

PRIOR ART REFERENCES

1 Load Rayleigh, "Notes on the Theory of Lubrication", Philosophical Magazine and Journal of Sciences, Vol. 53, 1918, pp. 1-12.

2 Martin H. M., "Theory of Michell Thrust Bearing", Engineering, Vol. 100, 1915, pp. 101-103, 154-155, 196-197, 207-208; Vol. 109, 1920, pp. 233-236, 338; Vol. 116, 1923, pp. 157, 203.

3 Fuller D. D., Theory and Practice of Lubrication for Engineers, Wiley, New York, 1956.

4 Pinkus, O., and Sternlicht, B., Theory of Hydrodynamic Lubrication, McGraw-Hill, New York, 1961.

5 Needs, S. J., "Effects of Side Leakage in 120 Degree Centrally Supported Journal Bearings", Trans. ASME, Vol. 56, 1934, pp. 209-219.

6 Needs, S. J., "Boundary Film Investigations", Trans. ASME, Vol. 62, 1940, pp. 331∝345.

7 Muskat, M. R., Morgan, F., and Meres, M. W., "The Lubrication of Sliders of Finite Width", Journal Applied Physics, Vol. 2, 1940, pp. 209-219.

8 Raimondi, A. A. and Boyd, J., "Applying Bearing Theory to the Analysis and Design of Shoe-Type Bearings", Trans. ASME, Vol. 77, No. 3, April, 1955, pp. 287-309.

9 Connor, J. J. (Editor-in Chief), and Boyd, J. (Technical Consultant), Standard Handbook of Lubrication Engineering, McGraw-Hill, New York, 1968.

10 Bosma, R., and Moes, H., "Design Charts for Optimum Bearing Configurations: 2 the Pivoted Shoe Thrust Bearings", ASME, Journal of Lubrication Technology, Vol. 92, 1970, pp. 572-577.

11 Kunin, I. A., "On the Hydrodynamic Theory of Lubrication of Shoe-Type Bearings", Translated from Original published in Russian; Akad, Nauk S.S.S.R., Issue 4-5, 1957, pp. 128-137.

12 Abramovitz, S., "Theory for a Slider Bearing with a Convex Shoe Surface; Side Flow Neglected", Franklin Institute Journal, Vol. 259, 1955, pp. 221-33.

13 Raimondi, A. A., and Boyd, J., "The Influence of Surface Profile on the Load Capacity of Thrust Bearings with Centrally Pivoted Shoes, Trans. ASME, Vol. 77, 1955, pp. 321-328; discussion, pp. 329-330.

14 Raimondi, A. A., "The Influence of Longitudinal and Transverse Profile on the Load Capacity of Pivoted Shoe Bearings", ASLE Trans., Vol. 3, No. 2, 1960, pp. 265-276.

15 Kinsler, L. E., and Fray, A. R., "Fundamentals of Acoustics, Willey, New York, 1962.

16 Singh, A. P., "Performance of Concentrators in Ultrasonic Machining", A dissertation submitted to the University of Manchester, England, (U.K.), for the degree of M.Sc., October 1976.

17 Archibald, F. R., "A Simple Hydrodynamic Thrust Bearing", Trans. ASME, Vol. 72, 1950, pp. 393-400.

18 Kettleborough, C. F., "The Stepped Thrust Bearing—A Solution by Relaxation Methods", ASME Trans., Journal of Applied Mechanics, Vol. 76, 1954, pp. 19-24.

19 Rhode, S. M., "Finite Element Optimization of Finite Stepped Slider Bearing Profiles", Trans. ASLE, Vol. 17, No. 2, 1974, pp. 105-110.

20 Maday, C. J., "The One-Dimensional Optimum Hydrodynamic Gas Slider Bearing", Journal of Lubrication of Technology, Trans. ASME, Series F, Vol. 90, No. 1, January 1968, pp. 281-284.

21 McAllister, G. T., Rohde, S. M., and McAllister, M. N., "A Note on the Optimum Design of Slider Bearings", Journal of Lubrication Technology, Trans. ASME, Series F, Vol. 102, No. 1, January 1980, pp. 117-119.

22 Charnes, A., and Saibel, E., "On the Solution of the Reynolds Equation for Slider Bearing Lubrication-Part 1", Trans. ASME, Vol. 74, 1952, pp. 867-873; Part II, Vol. 77, 1955, pp. 269-272; Parts-VI, VII, IX (with Osterle, F.), Vol. 75, 1953, pp. 1133-1136, Vol. 76, 1954, pp. 327-330, vol. 77, 1955, pp. 1185-1187.

23 Boegli, C. P., "Hydrodynamic Lubrication of Finite Slider", Journal of Applied Physics, Vol. 18, 1947. pp. 482-488.

24 Wood, W. L., "Note on a New Form of the Solution of Reynolds' Equation for Michell Rectangular and Sector-Shaped Shoes", Philosophical Magazine, Series 7, Vol. 40, 1949, pp. 220-26.

25 Michell, A.G.M., "The Lubrication of Plane Slider", Zeitschrift Fur Mathematik und physik, Vol. 52, 1905, pp. 123-137.

26 Kingsbury, A., "On Problems in the Theory of Fluid Film Lubrication with an Experimental Method of Solution", Trans. ASME, Vol. 53, 931, pp. 59-75.

27 Christopherson, D. G., "A New Mathmatical Method for the Solution of Film Lubrication Problems", Proceedings of the Institution of Mechanical Engineers, Vol. 146, 1947, pp. 126-135.

28 Castelli, V., and Shipiro, W., "Improved Method for Numerical Solution of the General Incompressible Fluid Film Lubrication Problem", ASME Journal of Lubrication Technology, Vol. 89, April 1967, pp. 211-218.

29 Singh, A. P., "Optimum Design of Hydrodynamic Slider Bearings of Different Film Shapes", Design Report, Department of Mechanical Engineering, 30. Carnahan, B., Luther, H.A., and Wilkes, J. O., Applied Numerical Methods, Willey, New York, 1969.
31. Reddi, M. M. "Finite Element Solution of the Incompressible Lubrication Problem", ASME Journal of Lubrication Technology, Vol. 91, 1969, pp. 524.
32. Wada, S., Hayashi, S., and Migita, "Application of Finite Element Method to Hydrodynamic Lubrication Problems-Part 1: Infinite Width Bearings", Bulletin of JSME, Vol. 14, 1971, pp. 1234.
33. Booker, J. F., and Huebner, K. H., "Application of Finite Element Methods to Lubrication; An Engineering Approach", ASME Journal of Lubrication Technology, Vol. 94, 1972, pp. 313-323.
34. Allaire, P. E., Nicholas, J. C., and Gunter, E. J., Jr., "Systems of Finite Elements for Finite Bearings", Journal of Lubrication Technology, Trans. ASME, Series F, Vol. 99, No. 2, April 1977, pp. 187-197.
35. Shaw, M. C., "An Analysis of the Parallel-Surface Thrust Bearing", *Trans. ASME, Vol.* 69, 1947, p. 387.
36. Cope W. F., "The Hydrodynamical Theory of Film Lubrication", *Proceedings of the Royal Society of London,* England, Series A, Vol. 197, 1949, p. 201.
37. Raimondi, A. A. and Boyd, J., "The Influence of Surface Profile on the Load Capacity of Thrust Bearings With Centrally Pivoted Shoes", *Trans. ASME,* Vol. 77, 1955, pp. 321-328, discussion, pp. 329-330.
38. Raimondi, A. A., "The Influence of Longitudinal and Transverse Profile on the Load Capacity of Pivoted Shoe Bearings", *ASLE Trans.,* Vol. 3, October 1960, pp. 265-276.
39. Pinkus, O. and Sternlicht, B., *Theory of Hydrodynamic Lubrication,* McGraw Hill, New York, 1961.
40. Conor, J. J. (Editor-In-Chief) and Boyd, J. (Technical Consultant), *Standard Handbook of Lubrication Engineering,* McGraw Hill Book Co., New York, 1968.

SUMMARY OF THE INVENTION

The present invention provides an improved pivoted shoe bearing including a shoe which has a mathmatically defined surface profile. In a preferred embodiment, rectangular shoes have a surface machined thereon in accordance with a mathematical relationship optimized as to load carrying capacity. The mathematically defined profile, which is defined by an optimum value of $\alpha$, is specific to the width and length of the shoe. In an alternate embodiment of the invention, a quadratic profile is machined upon a shoe in a centrally pivoted shoe bearing.

BRIEF DESCRIPTION OF THE DRAWINGS

A more complete understanding of the invention and its advantages will be apparent from the following description taken in conjunction with the accompanying drawings in which.

DETAILED DESCRIPTION

Figure 1:
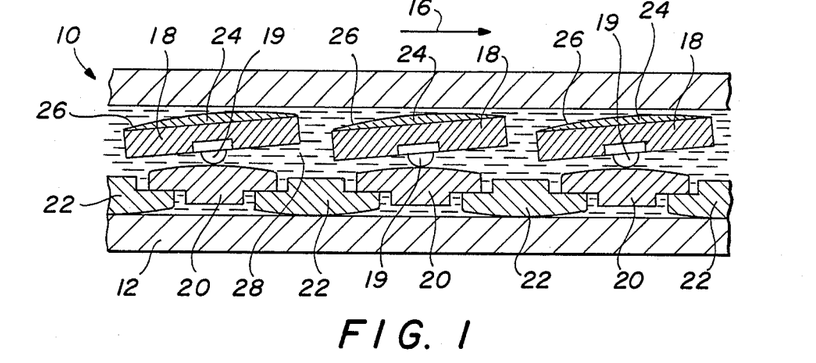
FIG. 1 is a partially broken away side view of a pivoted shoe bearing constructed in accordance with the present invention.

Referring initially to FIG. 1, bearing 10 is associated with machine frame 12. Thrust collar 14 is disposed to translate relative motion of machine frame 12 in the direction of arrow 16. A plurality of shoes 18 are pivotally restrained at pivots 19 by leveling plates 20, which span between inverted leveling plates 22. Leveling plates 20 and inverted leveling plated 22 serve to equalize the thrust transmitted by thrust collar 14 to shoes 18. Each shoe 18 includes a Babbitt lining 24. Babbitt linings 24 are machined to form surface 26 adjacent thrust collar 14. Lubricant 28 fills the voids between machine base 12 and thrust collar 14.

The thrust load imposed on thrust collar 14 is supported by the total number of shoes 18 in bearing 10. Shoes 18 are supported by pivots 19, such that when thrust collar 14 translates in the direction of arrow 16, shoes 18 pivot in a direction opposite to arrow 16.

The translation of thrust collar 14 in the direction of arrow 16 generates a hydrodynamic fluid film of lubricant 28 over shoes 18 which supports the thrust load and separates thrust collar 14 from surfaces 26. The hydrodynamic fluid film is created by the viscous or shear forces acting in lubricant 28 parallel to the direction of relative movement between the thrust collar 14 and surfaces 26. The boundary layer adjacent thrust collar 14 pulls the layer of lubricant 28 immediately adjacent to thrust collar 14, and in this way a velocity gradient is established in the lubricant in the gap between thrust collar 14 and surfaces 26. The gap between thrust collar 14 and surfaces 26 is wedge-shaped, which causes the pressure of lubricant drawn 28 into the gap to increase towards the narrow end of the gap, and thus creates a pressurized cushion or fluid film which dynamically supports the thrust load. The shape of the fluid-wedge is determined by the profile of surface 26.

Figure 2:
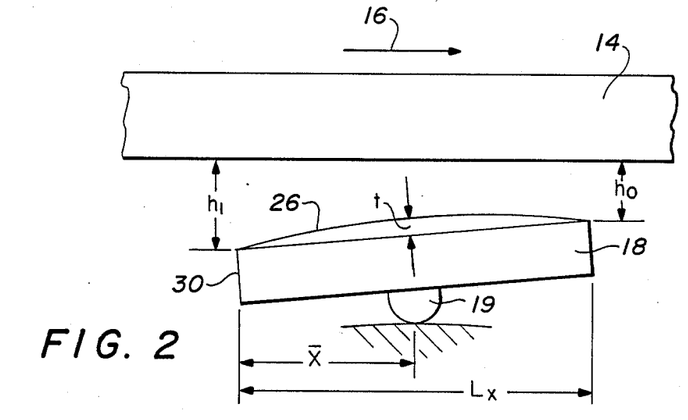
FIG. 2 is an enlarged, schematic view of a shoe constructed in accordance with the present invention.

FIG. 2 is an enlarged, schematic view of a single shoe 18. The thickness of the gap between thrust collar 14, which is maintained by the lubricant film, is designated by the reference figure $h_0$ at the point of minimum film thickness and the reference figure $h_1$ at the point of maximum film thickness. Surface 26 is designated by the thickness t of Babbitt layer 24. Thickness t is a function of x, which is measured from leading edge 30 of shoe 18. Shoe 18 has a total length in the x direction of $L_x$. Pivot 19 is located at a distance $\bar{x}$ from leading edge 30 of shoe 18.

Figure 3:
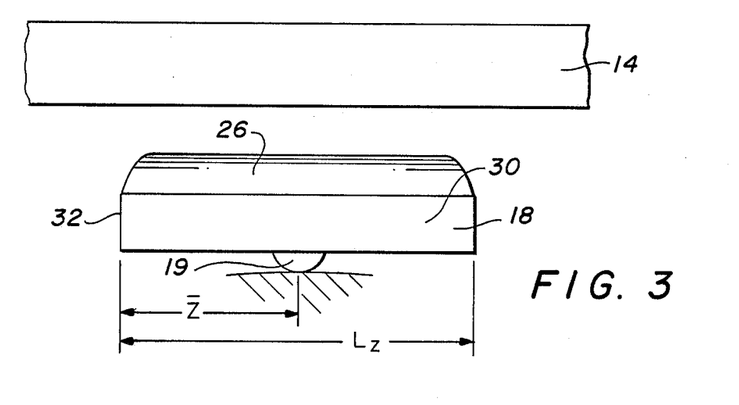
FIG. 3 is a view of the shoe of FIG. 2 rotated 90°.

Referring now to FIG. 3, shoe 18 has a total width of $L_z$. Pivot 19 is located at a distance $\bar{z}$ from edge 32 of shoe 18. In practice, the distance $\bar{z}$ will be equal to half of $L_z$.

Surface 26 may be obtained by machining a conventional flat surface shoe in such a manner that the thickness t of Babbitt layer 24 with respect to the x-axis for a particular shape is mathematically defined as follows:

(A) Exponential surface profile:

$$t = h_0[1.0 + (\alpha - 1)(x/L_x) - \exp(\ln \alpha(x/L_x))]$$

(B) Catenoidal surface profile:

$$t = h_0[1.0 + (\alpha - 1)(x/L_x) - \cos H(\cos H^{-1}\alpha(x/L_x))]$$

(C) Cycloidal surface profile:

$$t = h_0[(\alpha - 1) \sin(2\pi x/L_x)]/(2\pi)$$

(D) Truncated cycloidal surface profile:

$$t = h_0[(\alpha - 1) \sin(\pi x/L_x)]/\pi$$

Figure 4:
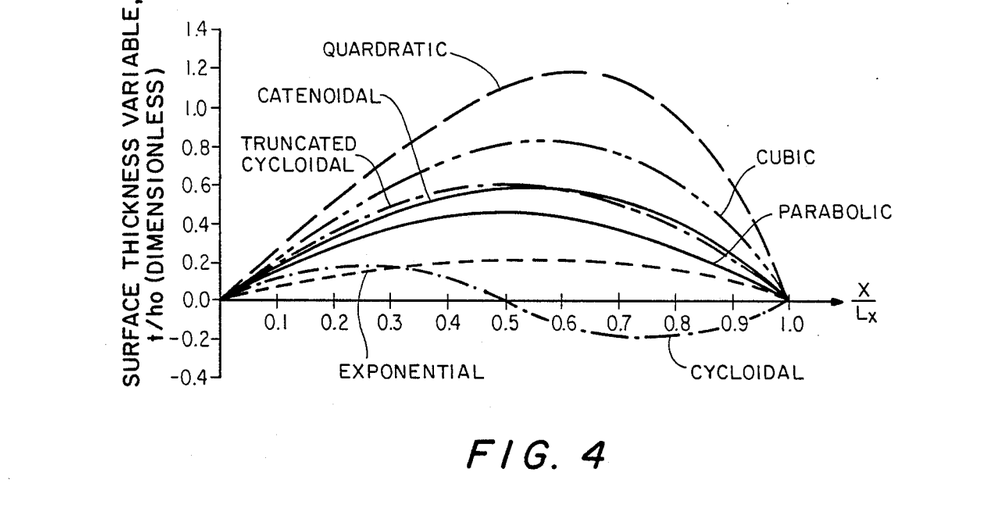
FIG. 4 is a comparison chart of proposed surface profiles for hydrodynamically lubricated pivoted square shoes at their optimum inclinations.

(E) Polynomial surface profile:

$$t = h_0(\alpha - 1)[(x/L_x) - (x/L_x)^n]$$

where n=2, 3 and 4 represents parabolic, cubic and quadratic surface profiles respectively. A comparative view of the different surface profiles for a square shoe at its optimum inclinations is shown in FIG. 4. Numerically controlled highly specialized tooling with the aid of unconventional machining processes can be used to obtain the precision required for the machining of these surface profiles.

A generalized computer program has been employed to solve the two dimensional Reynolds equation by using finite difference methods. A finite difference mesh was generated for the shoe geometry. In the analysis of continuous lubricant film shapes, variation in film thickness in both x and/or z directions was permitted. The program determined the pressure distribution in the lubricant for the specified minimum film thickness $h_0$, the film thickness ratio $\alpha$ and the lubricant viscosity $\mu$ at the average lubricant temperature. The load-carrying capacity W, pivot location $\bar{x}$, $\bar{z}$, flow rates of lubricant through the gap ($Q_x$, flow in the x direction, $Q_z$, flow in the z direction, and $Q_T$, total flow), coefficient of friction f, friction power loss and temperature rise $\Delta T$ relative to the lubricant inlet temperature were then determined. The analysis has been performed for several values of the film thickness ratio $\alpha$ in order to determine an optimum value of $\alpha$ with respect to a particular performance characteristic for a particular film shape.

The above information has been obtained collected for several film shapes including polynomial film shapes for different values of power factor n.

The numerical results from the computer analysis for $\alpha$ and nondimensional performance coefficients are shown below in Tables 1, 2, 3, 4, and 5 for $L_z/L_x$ ratios of 4.0, 2.0, 1.0, 0.5, and 0.25 respectively. The nondimensional performance coefficients are: pivot location coefficients $K_{\bar{x}}$, $K_{\bar{z}}$; load coefficient $K_p$, flow coefficients $K_Q$, $K_{Qz}$; flow ratio coefficient $R_Q$, friction force coefficient $K_f$; the coefficient of friction coefficient $K_c$, and the temperature rise coefficient $K_T$. These coefficients are defined as follows:

$$K_{\bar{x}} = \bar{x}/L_x = (0.5 \text{ for centrally pivoted shoe bearings}) \quad (1)$$

$$K_{\bar{z}} = \bar{z}/L_z = 0.5 \text{ (due to symmetrical pressure distribution)} \quad (2)$$

$$K_p = W h_0^2 / \mu U L_x^2 L_z \quad (3)$$

$$K_Q = Q_T / U h_0 L_z \quad (4)$$

$$R_Q = Q_z / Q_T \quad (5)$$

$$K_{Qz} = R_Q K_Q \quad (6)$$

$$K_f = E_T h_0 / \mu U^2 L_x L_z \quad (7)$$

$$K_c = f L_x / h_0 \quad (8)$$

and $$K_T = \Delta T h_0^2 J \gamma C / \mu U L_x \quad (9)$$

where U equals the velocity of thrust collar 14, W equals the maximum load carrying capacity shoe 18, $\mu$ equals the absolute velocity of lubricant 28, $E_T$ equals the total friction power loss due to flow in the x and z directions, $\Delta T$ equals $T_2 - T_1$ ($T_2$ and $T_1$ are the outlet and inlet temperatures respectively), J equals the mechanical equivalent of heat, $\gamma$ equals the weight density of lubricant 28 and C equals the specific heat of lubricant 28.

TABLE 1

Optimum Performance Coefficients for different surface profiles, $L_z/L_x = 4.0$

| SURFACE PROFILE | $\alpha$ | $K_{\bar{x}}$ | $K_p$ | $K_Q$ | $R_Q$ | $K_f$ | $K_c$ | $K_T$ |
|---|---|---|---|---|---|---|---|---|
| Flat | 2.2 | 0.5735 | 0.13214 | 0.6750 | 0.0950 | 0.8980 | 6.7500 | 1.9628 |
| Exponential | 2.3 | 0.5665 | 0.13818 | 0.6691 | 0.0955 | 0.9322 | 6.7050 | 2.0538 |
| Catenoidal | 2.5 | 0.5452 | 0.15030 | 0.6454 | 0.0956 | 1.0314 | 6.8100 | 2.3383 |
| Cycloidal | 2.0 | 0.5605 | 0.16134 | 0.6647 | 0.1007 | 1.0340 | 6.3600 | 2.3086 |
| Trunicated Cycloidal | 2.5 | 0.5356 | 0.15075 | 0.6338 | 0.0976 | 1.0633 | 7.0050 | 2.4507 |
| Parabolic | 2.5 | 0.5525 | 0.15196 | 0.6562 | 0.1004 | 1.0310 | 6.7350 | 2.3082 |
| Cubic | 2.7 | 0.5265 | 0.14490 | 0.6629 | 0.0948 | 1.0692 | 7.335 | 2.4927 |
| Quadratic | 2.9 | 0.5057 | 0.13370 | 0.6023 | 0.0890 | 1.0836 | 8.0700 | 2.5878 |

TABLE 2

Optimum Performance Coefficients for different surface profiles,
$L_z/L_x = 2.0$

| SURFACE PROFILE | α | $K_{\bar{x}}$ | $K_p$ | $K_Q$ | $R_Q$ | $K_f$ | $K_c$ | $K_T$ |
|---|---|---|---|---|---|---|---|---|
| Flat | 2.2 | 0.5794 | 0.10947 | 0.7408 | 0.1881 | 0.8652 | 7.7852 | 1.7959 |
| Exponential | 2.4 | 0.5727 | 0.11556 | 0.7465 | 0.1998 | 0.9027 | 7.6791 | 1.8661 |
| Catenoidal | 2.6 | 0.5475 | 0.12756 | 0.7160 | 0.1999 | 1.0017 | 7.7428 | 2.1460 |
| Cycloidal | 2.1 | 0.5683 | 0.13382 | 0.7433 | 0.2131 | 1.0018 | 7.3397 | 2.1024 |
| Truncated Cycloidal | 2.6 | 0.5374 | 0.12852 | 0.7055 | 0.2042 | 1.0344 | 7.9337 | 2.2488 |
| Parabolic | 2.6 | 0.5561 | 0.12858 | 0.7325 | 0.2092 | 0.9988 | 7.6367 | 2.1047 |
| Cubic | 2.8 | 0.5232 | 0.12413 | 0.6838 | 0.1913 | 1.0394 | 8.2519 | 2.3044 |
| Quadratic | 3.0 | 0.5034 | 0.11537 | 0.6652 | 0.1876 | 1.0602 | 9.1104 | 2.3998 |

TABLE 3

Optimum Performance Coefficients for different surface profiles,
$L_z/L_x = 1.0$

| SURFACE PROFILE | α | $K_{\bar{x}}$ | $K_p$ | $K_Q$ | $R_Q$ | $K_f$ | $K_c$ | $K_T$ |
|---|---|---|---|---|---|---|---|---|
| Flat | 2.3 | 0.5963 | 0.6993 | 0.8853 | 0.3351 | 0.7971 | 11.10 | 1.4763 |
| Exponential | 2.7 | 0.5897 | 0.07564 | 0.9401 | 0.3779 | .83167 | 10.65 | 1.4830 |
| Catenoidal | 3.0 | 0.5575 | 0.08664 | 0.9079 | 0.3898 | 0.9368 | 10.50 | 1.7352 |
| Cycloidal | 2.2 | 0.5822 | 0.08593 | 0.8861 | 0.3703 | 0.9129 | 10.26 | 1.7259 |
| Truncated Cycloidal | 2.9 | 0.5429 | 0.08817 | 0.8874 | 0.3891 | 0.9691 | 10.68 | 1.8345 |
| Parabolic | 2.8 | 0.5629 | 0.08660 | 0.9046 | 0.3839 | 0.9244 | 10.35 | 1.7154 |
| Cubic | 3.2 | 0.5307 | 0.08622 | 0.8666 | 0.3803 | 0.9825 | 11.10 | 1.8918 |
| Quadratic | 3.5 | 0.5027 | 0.08150 | 0.8314 | 0.3670 | 1.0126 | 12.15 | 2.0096 |

TABLE 4

Optimum Performance Coefficients for different surface profiles,
$L_z/L_x = 0.5$

| SURFACE PROFILE | α | $K_{\bar{x}}$ | $K_p$ | $K_Q$ | $R_Q$ | $K_f$ | $K_c$ | $K_T$ |
|---|---|---|---|---|---|---|---|---|
| Flat | 2.5 | 0.6285 | 0.02978 | 1.0457 | 0.4697 | 0.6925 | 22.6979 | 1.1530 |
| Exponential | 3.2 | 0.6173 | 0.03326 | 1.2286 | 0.5507 | 0.7049 | 20.4918 | 1.0499 |
| Catenoidal | 3.8 | 0.5750 | 0.03973 | 1.2978 | 0.5927 | 0.8024 | 19.4735 | 1.1610 |
| Cycloidal | 2.6 | 0.6207 | 0.03761 | 1.1616 | 0.5437 | 0.7733 | 19.8129 | 1.2146 |
| Truncated Cycloidal | 3.7 | 0.5602 | 0.04075 | 1.2988 | 0.6000 | 0.8336 | 19.6857 | 1.2101 |
| Parabolic | 3.4 | 0.5852 | 0.03915 | 1.2490 | 0.5745 | 0.7865 | 19.3887 | 1.1695 |
| Cubic | 4.2 | 0.5427 | 0.04079 | 1.3253 | 0.6100 | 0.8563 | 20.2372 | 1.2263 |
| Quadratic | 4.8 | 0.5038 | 0.03974 | 1.3212 | 0.6140 | 0.9051 | 22.0191 | 1.3030 |

TABLE 5

Optimum Performance Coefficients for different surface profiles,
$L_z/L_x = 0.25$

| SURFACE PROFILE | α | $K_{\bar{x}}$ | $K_p$ | $K_Q$ | $R_Q$ | $K_f$ | $K_c$ | $K_T$ |
|---|---|---|---|---|---|---|---|---|
| Flat | 2.8 | 0.6761 | 0.00977 | 1.2077 | 0.5564 | 0.6047 | 61.14 | 0.9138 |
| Exponential | 4.1 | 0.6622 | 0.01099 | 1.6461 | 0.6764 | 0.5845 | 52.14 | 0.7039 |
| Catenoidal | 5.6 | 0.6142 | 0.01298 | 2.0607 | 0.7513 | 0.6504 | 48.78 | 0.6606 |
| Cycloidal | 3.6 | 0.6786 | 0.01234 | 1.6209 | 0.6840 | 0.6179 | 48.78 | 0.7596 |
| Truncated Cycloidal | 5.3 | 0.5979 | 0.01323 | 2.0465 | 0.7525 | 0.6733 | 49.50 | 0.6891 |
| Parabolic | 4.6 | 0.6319 | 0.01271 | 1.8158 | 0.7165 | 0.6366 | 48.90 | 0.7152 |
| Cubic | 6.2 | 0.5749 | 0.01334 | 2.2198 | 0.7724 | 0.6946 | 50.64 | 0.6653 |
| Quadratic | 7.3 | 0.5183 | 0.01327 | 2.3807 | 0.7891 | 0.7512 | 55.02 | 0.6796 |

Table 6 provides a comparative view of load carrying capacity performance coefficient $K_p$ of shoe 18 at its optimum inclination α for all the considered surface profiles for a range of $L_z/L_x$ ratios. The performance of an infinitely wide bearing is also shown in Table 6 for comparison purposes. The net gain in load carrying capacity of using these profiles as compared to a conventional flat surface shoe is also shown in parentheses in the same table. The maximum gain in load carrying capacity for each $L_z/L_x$ ratio is designated by an asterisk (*).

TABLE 6

Load coefficient $K_p$ and the gain with respect to conventional shoe for different values of $L_z/L_x$ and optimum $\alpha$ for the considered surface profiles.

| SURFACE PROFILE | $L_z/L_x$ | | | | | |
|---|---|---|---|---|---|---|
| | 0.25 | 0.5 | 1.0 | 2.0 | 4.0 | ∞ |
| Flat | 0.00977 (1.00) | 0.02978 (1.00) | 0.6993 (1.00) | 1.0947 (1.00) | 0.13214 (1.00) | 0.16025 (1.00) |
| Exponential | 0.01099 (1.1249) | 0.03326 (1.1167) | 0.07564 (1.0817) | 0.11556 (1.0556) | 0.13818 (1.0457) | 0.16518 (1.0308) |
| Catenoidal | 0.01298 (1.3286) | 0.03973 (1.3340) | 0.08664 (1.2390) | 0.12756 (1.1653) | 0.15030 (1.1374) | 0.17500 (1.0920) |
| Cycloidal | 0.01234 (1.2631) | 0.03761 (1.2629) | 0.08593 (1.2288) | 0.13382 (1.2224)* | 0.16134 (1.2210)* | 0.1924 (1.2006)* |
| Truncated Cycloidal | 0.01323 (1.3542) | 0.04075 (1.3683) | 0.08817 (1.2608)* | 0.12852 (1.1740) | 0.15075 (1.1408) | 0.1749 (1.0914) |
| Parabolic | 0.0127 (1.3009) | 0.03915 (1.3146) | 0.08660 (1.2384) | 0.12858 (1.1492) | 0.15196 (1.1420) | 0.1774 (1.1070) |
| Cubic | 0.01334 (1.3654)* | 0.04079 (1.3697)* | 0.08622 (1.2330) | 0.12413 (1.1339) | 0.14490 (1.0966) | 0.1672 (1.0434) |
| Quadratic | 0.01327 (1.3582) | 0.03974 (1.3345) | 0.08150 (1.1655) | 0.11537 (1.0539) | 0.13370 (1.0118) | 0.1532 (0.9560) |

Several important characteristics of the various surface profiles should be noted from the results given in Tables 1 through 6:

(1) The value of optimum $\alpha$ increases as the $L_z/L_x$ ratio of shoe 18 with any surface profile is reduced.

(2) The range of capacity in load carrying increases from 20% for an infinitely wide shoe having a cycloidal surface to a 37% gain for a narrow shoe with $L_z/L_x$ ratio of 0.25 having a cubic (polynomial with n=3) surface demonstrates the importance of film shape effects.

(3) The dimensions of shoe 18, such as the $L_z/L_x$ ratio, have a tremendous impact on the selection of the type of profile for surface 26 to be used while designing a pivoted shoe bearing. As observed in Table 6, the performance of the cycloidal surface 26 is excellent for wider shoes with a $L_z/L_x$ ratios of 2 and more, whereas truncated cycloidal surfaces 26 offer better results than cycloidal surfaces 26 for narrow shoes with $L_z/L_x$ equal to one or less than one. This fact is also demonstrated by polynomial surfaces 26 having different values of power factor n. The optimum value of power factor n required to provide maximum load carrying capacity changes from n=2 for wider shoes 18 to n=3 for narrow shoes 18.

(4) For a polynomial surface 26 with power factor n equal to 4.0, a quadratic surface, the location of pivot 19 which would provide the maximum load carrying capacity has been found to be very close to the center of the shoe 18. For $L_z/L_x$ equal to 1.0, for example, the location of pivot 19 is found to be at 0.5027 of the length of shoe 18. Moreover, as observed in the tables for different $L_z/L_x$ ratios and also in the case of infinitely wide shoes the pivot location is closer to the center in the case of quadratic surface profiles, and is not limited to a square shoe. This important feature of quadratic surface profiles provides an additional capability of reversibility of operation along with its improved load carrying capacity, because of the central location of pivot 19.

The optimum design charts in FIGS. 5–12 have been developed using results shown in Tables 1–5 for each particular profile of surface 26 for the maximum load carrying capacity. In pivoted shoe bearings, the value of $\alpha$ is controlled by the location of pivot 19 and becomes independent of $h_0$, U or $\mu$. There are six variables which can affect the load carrying capacity and other characteristics of a pivoted shoe bearing and are listed as $h_0$, $\bar{x}$ (or $\alpha$), $L_z$, $L_x$, U and $\mu$. Once $L_z$ and $L_x$ are fixed, there is one value of pivot location $\bar{x}$ which provides an optimum value of film thickness ratio $\alpha$ for a particular film shape at which bearing 10 carries the maximum load. Viscosity and speed have a linear relationship with the load carrying capacity. Hence, the main objective is to find an optimum value of $\alpha$ and its corresponding pivot location for a given $L_z/L_x$ ratio for a particular surface profile. The six non-dimensional performance coefficients $K_p$, $K_Q$, $R_Q$, $K_f$, $K_c$, and $K_T$ are used as design variables which define the performance characteristics of an optimum bearing for a specific value of the $L_z/L_x$ ratio, meanwhile defining the optimum value of the film thickness ratio $\alpha$.

The selection of a particular surface profile depends upon the $L_z/L_x$ ratio of the shoe and the required behavior of other performance characteristics such as flow rate, side flow, frictional power loss, coefficient of friction and temperature rise. The following two numerical examples illustrate the use of the design charts given in FIGS. 5 through 12.

EXAMPLE 1

A pivoted shoe bearing 10 is to have optimum performance characteristics, with $L_z/L_x=0.5$ in order to carry a load of 5000 lbf (22241N) and a minimum film thickness $h_0$ of 0.002 in. (0.0508 mm) for a thrust collar 14 velocity U of 1200 in/sec (30.48 m/sec). Lubricant 28 is medium turbine oil entering leading edge 30 of bearing at 120° F. (48.89° C.) has $\gamma=0.035$ lbf/in³ (0.00626 Kg/Cm³), C=0.5 BTU/lbf-°F. (2093 J/Kg-°C.), and constants K1 and K2 are −3.4560 and 23.8501 respectively. The kinematic viscosity $v$ of lubricant 28 in centistokes as a function of temperature T in °F. is given as $$v = \exp[\exp(K1 \ln(T+460) + K2] - 0.6$$

The coefficient of viscosity $v$ of lubricant 28 in lbf-S/in² is given as $$\mu = v\rho_t 1.45 \times 10^{-7}$$

The density of lubricant 28 $\rho_t$ at temperature T is given as $$\rho_t = \rho_{60}/[1 + \beta(T-60)]$$

where $\rho_{60}$ is the density of lubricant 28 at 60° F. temperature and $\beta$ is the coefficient of expansion. The values of $\rho_{60}$ and $\beta$ for lubricant 28 are 0.877 and 0.000437 respectively.

As observed in Table 6, for the given $L_z/L_x$ ratio of 0.5, the cubic surface profile (polynomial with n=3) offers the maximum load carrying capacity. Hence, pivoted shoe bearing 10 having a cubic surface 26 profile will be designed, and then the performance with a conventional flat surface will be compared with the performance of the designed bearing 10.

Cubic Surface Profile

Figure 11:
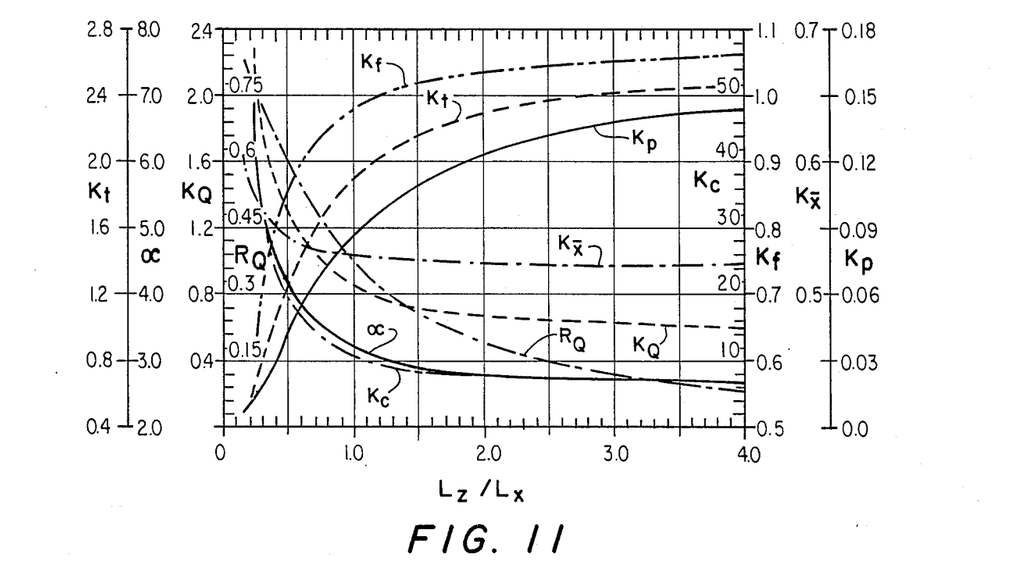
FIG. 11 is a chart of the optimum values of performance coefficients for a pivoted shoe bearing having a cubic surface profile.
Figure 12:
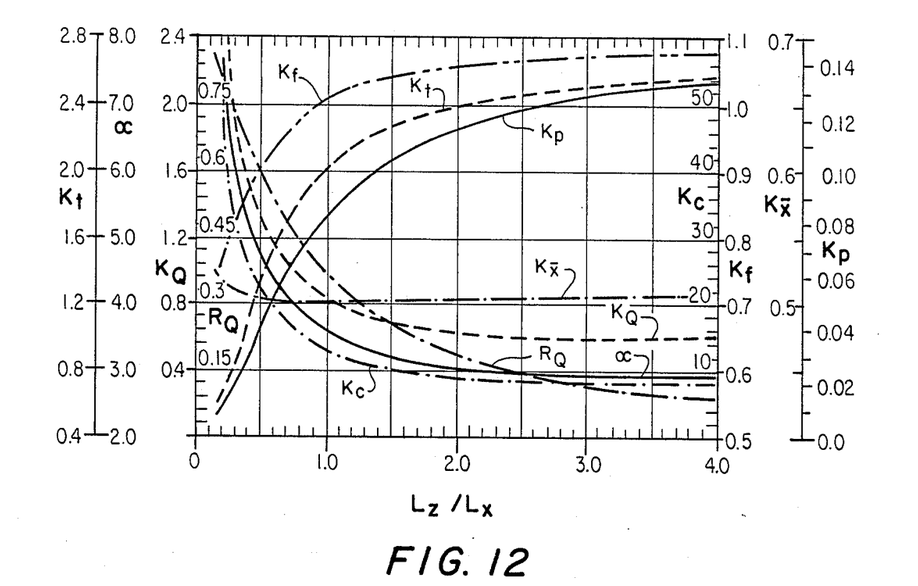
FIG. 12 is a chart of the optimum values of performance coefficients for a pivoted shoe bearing having a quadratic surface profile.

Using FIG. 11, for $R_t=L_z/L_x=0.5$: $\alpha=4.2$, $K_{\bar{x}}=0.5427$, $K_p=0.04079$, $K_Q=1.3253$, $R_Q=0.6100$, $K_f=0.8563$, $K_c=20.2372$, and $K_T=1.2263$.

The coefficient of viscosity $\mu$ at inlet temperature 120° F. is calculated using the viscosity-temperature relationship and is equal to $4.5579\times10^{-6}$ lbf-S/in². Substituting $L_z=R_t L_x$ in equation (3), $$L_x = \left[\frac{Wh_0^2}{\mu U R_t K_p}\right]^{\frac{1}{3}}$$

$$= \left[\frac{5000\times 0.002\times 0.002}{4.5579\times 10^{-6}\times 1200\times 0.5\times 0.04079}\right]^{\frac{1}{3}}$$

$$= \frac{5.6388 \text{ in.}}{(14.3226 \text{ Cm})}$$

Before accepting these dimensions the values of $\Delta T$ must be balanced such that the average film temperature, as determined from viscous losses, coincides with the temperature-viscosity property of the given lubricant. Thus, from equation (9), $$T = \frac{4.5579\times 10^{-6}\times 1200\times 5.6388\times 1.2263}{(0.002)^2\times 778\times 12\times 0.035\times 0.5} = 57.8721° \text{ F.}$$

and the average temperature is $$T_{avg}=148.9360° \text{ F.}$$

At this temperature, $$\mu=2.5036\times 10^{-6} \text{ lbf-S/in}^2,$$

and $$L_x=6.8853 \text{ in. (17.4887 Cm)}$$

$$\Delta T=38.8149° \text{ F. (3.786° C.)}$$

$$T_{avg}=139.4074° \text{ F. (59.67° C.)}$$

After six more iterations the final value of $\mu$ at average temperature 141.3766° F. is $2.8941\times 10^{-6}$ lbf-S/in².
From equations (1) through (9), we find
$L_x=6.5605$ in. 916.6637 Cm)
$L_z=3.2808$ in. (8.3318 Cm)
$\bar{x}=0.5427\times 6.5605=3.5604$ in. (9.0434 Cm)
$\bar{z}=0.5\times 3.2802=1.6401$ in. (4.1659 Cm)
$Q_T=10.4334$ in³/sec (170.9728 Cm³/sec)
$Q_z=6.3644$ in³/sec (104.2934 Cm³/sec)
friction horsepower=5.8179 horsepower (4338.3985 W)
f=0.00617

T=42.7533° F. (5.9741° C.)

Conventional Flat Surface Profile

Figure 5:
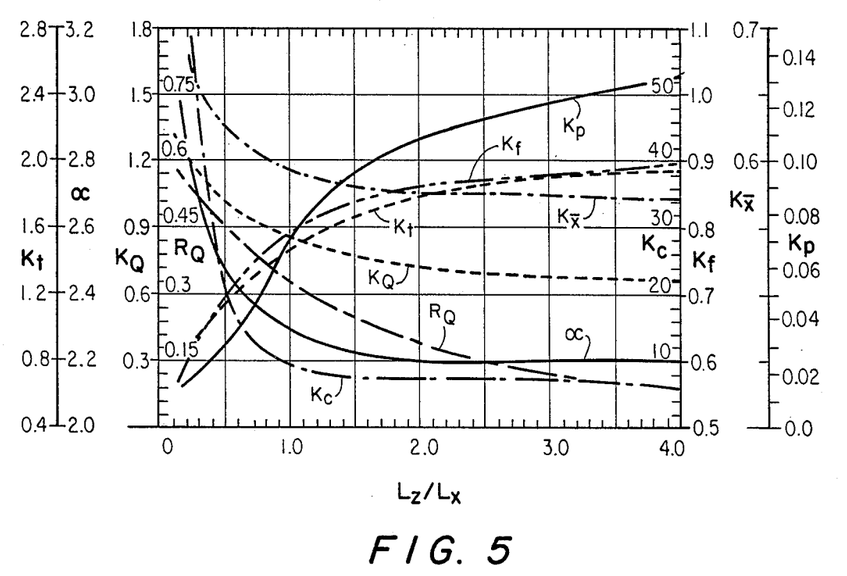
FIG. 5 is a chart of the optimum values of performance coeffecients for a pivoted shoe bearing having a conventional flat face surface.
Figure 6:
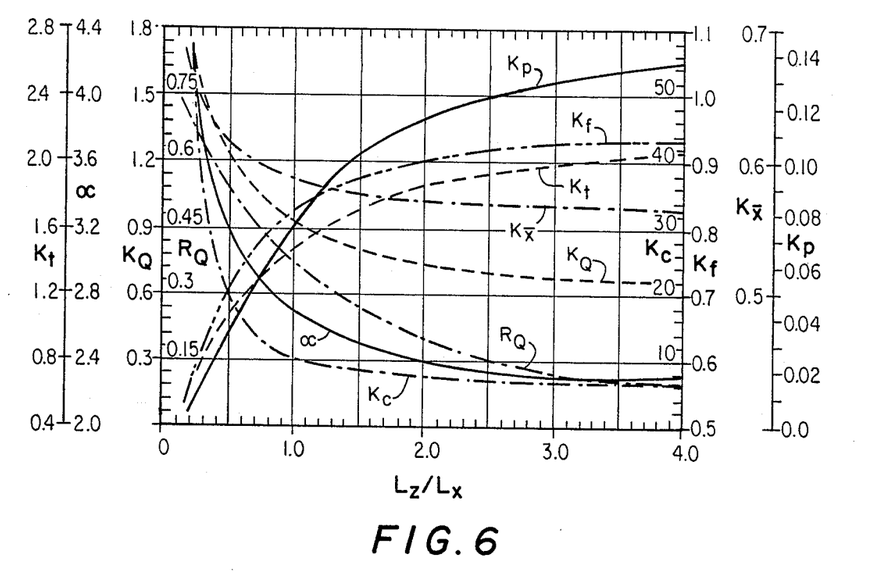
FIG. 6 is a chart of the optimum values of performance coefficients for a pivoted shoe bearing having an exponential surface profile.
Figure 7:
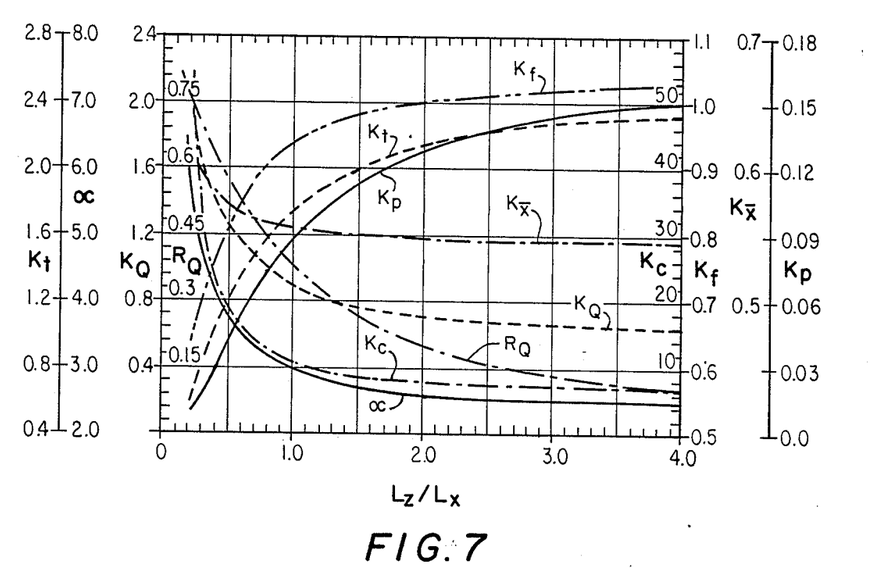
FIG. 7 is a chart of the optimum values of performance coefficients for a pivoted shoe bearing having a catenoidal surface profile.
Figure 8:
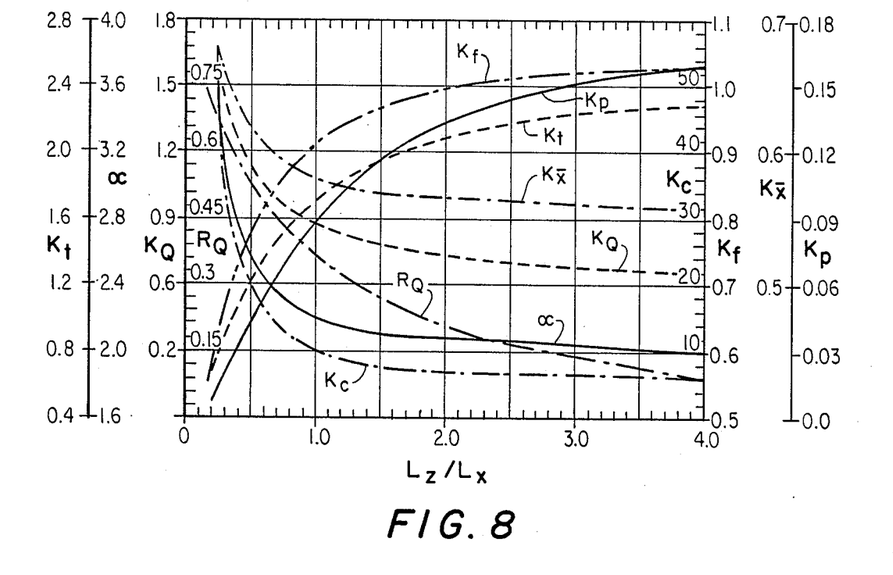
FIG. 8 is a chart of the optimum values of performance coefficients for a pivoted shoe bearing having a cycloidal surface profile.
Figure 9:
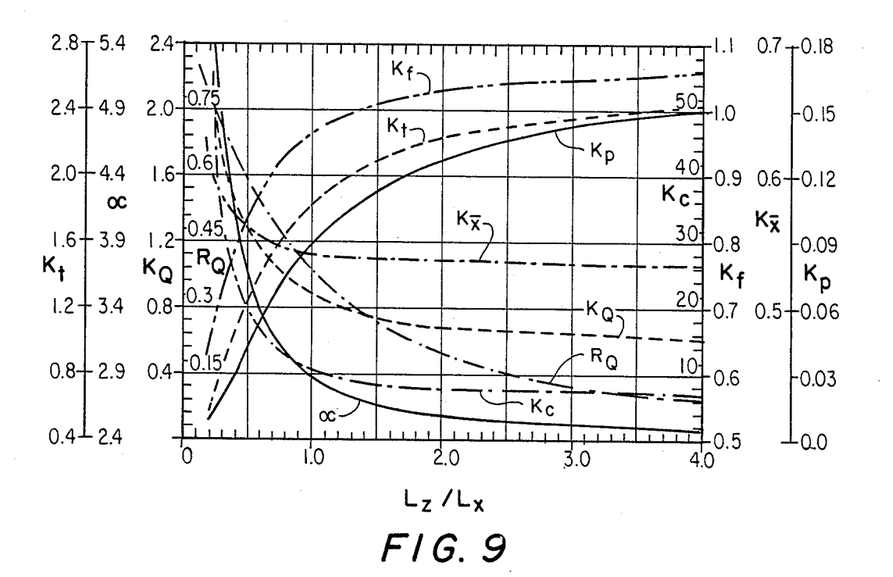
FIG. 9 is a chart of the optimum values of performance coefficients for a pivoted shoe bearing having a truncated cycloidal surface profile.
Figure 10:
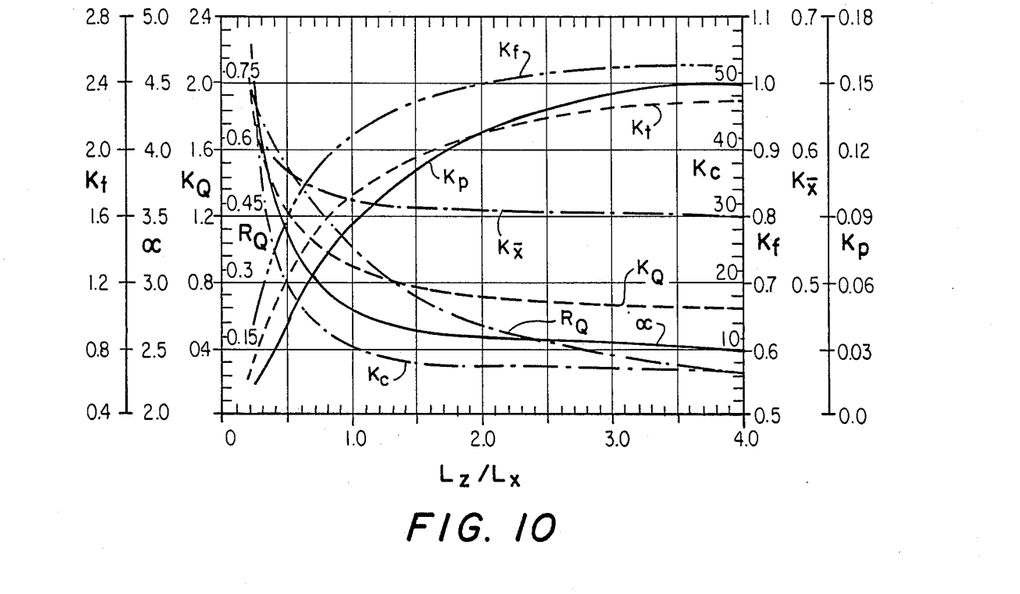
FIG. 10 is a chart of the optimum values of performance coefficients for a pivoted shoe bearing having a parabolic surface profile.

Using FIG. 5 for $R_t=0.5$, we have $\alpha=2.5$, $K_{\bar{x}}=0.6285$, $K_p=0.02978$, $K_Q=1.0457$, $R_Q=0.4697$, $K_f=0.6925$, $K_c=22.6295$, and $K_T=1.1530$.

Repeating the heat balance loop for 12 iterations the final value of $\mu$ at average temperature 142.1084° F. is found to be $2.8528\times 10^{-6}$ lbf-S/in². Using equations (1) through (9) we find
$L_x=7.3208$ in. (18.5948 Cm)
$L_z=3.6604$ in. (9.2974 Cm)
$\bar{x}=4.6011$ in. (11.6868 Cm)
$\bar{z}=1.8302$ in. (4.6487 Cm)
$Q_T=9.1864$ in³sec (150.5381 Cm³/sec)
$Q_z=4.3149$ in³sec (70.7085 Cm³/sec)
friction horsepower=5.7752 horsepower (4306.57 W)
f=0.00618
$\Delta T=44.2167°$ F. (6.7871° C.)

It should be noted that for the desired load carrying capacity, the proposed design with new surface 26 requires a lesser shoe area 18 as compared to the conventional flat surface design, and thereby the size and space required for bearing 10 are reduced.

EXAMPLE 2

Pivoted shoe bearing 10 is to have a truncated cycloidal surface 26, whose dimensions are $L_x=6$ in. (15.24 Cm) and $L_z=6$ in. (15.24 Cm). For the same lubricant 28 as used in the previous example and a thrust collar 14 velocity of 500 in/sec (12.7 m/sec), bearing 10 has a load carrying capacity of 10,000 lbf (44482N).

To analyze this bearing 10, the minimum film thickness $h_0$ must be determined, balancing $\Delta T$. For $R_t=6/6=1.0$, from FIG. 9, we read the properties of this bearing 10 as: $\alpha=2.9$, $K_{\bar{x}}=0.5429$, $K_p=0.08817$, $K_Q=0.8874$, $R_Q=0.3891$, $K_f=0.9691$, $K_c=10.6800$ and $K_T=1.8345$.

Using the viscosity-temperature relationship, $\mu_{120}=4.5579\times 10^{-6}$ lbf-S/in².

Substituting the value of $K_p$ in equation (3), we have $$h_0 = \left[\frac{4.5579\times 10^{-6}\times 500\times 6\times 6\times 6\times 0.08817}{10,000}\right]^{\frac{1}{2}}$$

$$= \frac{0.002083 \text{ in.}}{(0.05292 \text{ mm})}$$

Before accepting these calculations, the value of $\Delta T$ must be balanced as discussed in the previous example. Thus, from equation (9) we find $$\Delta T = \left[\frac{4.5579\times 10^{-6}\times 500\times 6\times 1.8345}{(0.002083)^2\times 778\times 12\times 0.035\times 0.5}\right] = \frac{35.3856° \text{ F.}}{(1.8810° \text{ C.})}$$

and average temperature as
$T_{avg}=137.6928°$ F. (58.7182° C.).
At this temperature, $\mu=3.1146\times 10^{-6}$, and $h_0=0.001722$ inc. (0.04374 mm)
T=35.3754° F. (1.8752° C.)
$T_{avg}=137.6877°$ F. (58.7154° C.), which is close to the previous value. Hence, using equations (1 through 9), we find
$\bar{x}=3.2574$ in. (8.2739 Cm)

$\bar{z}$=3.0 in. (7.62 Cm)
$Q_T$=4.5850 in³/sec (75.1347 Cm³/sec)
$Q_z$=1.7840 in³/sec (29.2345 Cm³/sec)
friction horsepower=2.3890 horsepower (1781.4773 W)
f=0.0031

Repeating the same procedure using FIG. 5 for a conventional flat surface pivoted shoe, the minimum film thickness is found to be 0.00152 in. (0.0386 mm). This shows that the use of truncated cycloidal surface 26 instead of a conventional flat surface pivoted shoe improves the factor of safety by increasing minimum film thickness for the given operating load.

It is thus apparent that one dimensional continuous surface profiles have a significant effect on the load carrying capacity of both infinitely wide as well as finite pivoted shoe bearings. The selection of a particular surface profile depends upon the dimensions of the shoe. The performance of cycloidal profiles is optimal for wider bearings with $L_z/L_x$ ratio of 2 and more, whereas truncated cycloidal profiles are optimal for narrow bearings with $L_z/L_x \leq 1.0$. Similarly, the optimum polynomial surface profile changes from parabolic (n=2) for wider bearings to cubic (n=3) for narrow bearings. The quadratic surface profile, along with its improved load carrying capacity, also provides a pivot location near center, which is very useful in attaining reversibility of operation.

Centrally pivoted shoe bearings are commonly used in marine work and several other fields where it is required that the bearing be capable of rotating or translating in both directions. As noted above, the quadratic profile for surface 26 provides a pivot location near center in most instances. The performance coefficients $K_{\bar{x}}$ and $K_p$ for certain values of $\alpha$ where $K_{\bar{x}}$ is close to 0.5 are shown in Table 7 along with the results obtained from FIGS. 7 and 8 of Reference [12] for the centrally pivoted shoe bearing with convex surface profiles.

TABLE 7

Performance coefficient $K_p$ for an infinitely wide centrally pivoted shoe bearing with convex (Reference [12]) and quadratic surface profiles.

| Convex Surface Profile [12] | | | Quadratic Surface Profile | | |
|---|---|---|---|---|---|
| $h_1/h_2$ | $\delta/h_0$ | $K_p$ | $\alpha$ | $K_{\bar{x}}$ | $K_p$ |
| 1.43 | 0.1 | 0.1239 | 2.4 | 0.495 | 0.1515 |
| 1.77 | 0.3 | 0.1512 | 2.5 | 0.499 | 0.1524 |
| 2.15 | 0.6 | 0.1314 | 2.6 | 0.501 | 0.1529 |
| 2.65 | 0.9 | 0.1162 | 2.7 | 0.504 | 0.1532 |
| 3.31 | 1.2 | 0.0984 | | | |

Comparison of results for these two different designs clearly indicate that the load carrying capacity of a quadratic surface profile is better than a convex surface profile even for the optimum crown height ratio $\delta/h_0$ of Reference [12]. It should be noted that in view of fluctuating load conditions, it would be very difficult to maintain the optimum values of $\delta/h_0$ in practice. Moreover, a quadratic continuous surface profile does not form any inactive film portions such as the converging-diverging films found in the case of convex surface profiles, and thus, use of a quadratic profile leads to an improved load carrying capacity.

The numerical results for nondimensional performance coefficients $K_p$, $K_Q$, $R_Q$, $K_f$, $K_c$ and $K_T$ for a few values of shoe inclination $\alpha$ have been calculated where the pivot location coefficient $K_{\bar{x}}$ is close to 0.5. The results are shown in Table 8 for a wide range of $L_z/L_x$ ratios from 0.25 for narrow bearings to 4.0 for wide bearings.

TABLE 8

Performance coefficients for different $L_z/L_x$ ratios of centrally pivoted shoe bearing with quadratic surface profile.

| $L_z/L_x$ | $\alpha$ | $K_{\bar{x}}$ | $K_p$ | $K_Q$ | $R_Q$ | $K_f$ | $K_c$ | $K_T$ |
|---|---|---|---|---|---|---|---|---|
| 0.25 | 6.1 | 0.496 | 0.01324 | 2.2095 | 0.7528 | 0.7695 | 56.70 | 0.7946 |
| | 6.2 | 0.498 | 0.01324 | 2.0588 | 0.7563 | 0.7678 | 56.52 | 0.7836 |
| | 6.3 | 0.500 | 0.01325 | 2.0881 | 0.7597 | 0.7662 | 56.34 | 0.7729 |
| | 6.4 | 0.502 | 0.01325 | 2.1173 | 0.7630 | 0.7645 | 56.22 | 0.7625 |
| | 6.5 | 0.504 | 0.01326 | 2.1466 | 0.7663 | 0.7630 | 56.04 | 0.7524 |
| 0.50 | 4.5 | 0.496 | 0.03971 | 1.2619 | 0.5963 | 0.9073 | 22.15 | 1.3520 |
| | 4.6 | 0.498 | 0.03973 | 1.2817 | 0.6023 | 0.9066 | 22.10 | 1.3353 |
| | 4.7 | 0.500 | 0.03974 | 1.3014 | 0.6082 | 0.9058 | 22.06 | 1.3189 |
| | 4.8 | 0.503 | 0.03974 | 1.3211 | 0.6140 | 0.9051 | 22.02 | 1.3030 |
| | 4.9 | 0.506 | 0.03974 | 1.3408 | 0.6195 | 0.9043 | 22.02 | 1.2874 |
| 1.0 | 3.2 | 0.494 | 0.08124 | 0.7993 | 0.3433 | 1.0080 | 12.15 | 2.0554 |
| | 3.3 | 0.497 | 0.08139 | 0.8101 | 0.3515 | 1.0100 | 12.15 | 2.0340 |
| | 3.4 | 0.500 | 0.08147 | 0.8208 | 0.3594 | 1.0112 | 12.15 | 2.0247 |
| | 3.5 | 0.502 | 0.08150 | 0.8314 | 0.3670 | 1.0126 | 12.17 | 2.0096 |
| | 3.6 | 0.505 | 0.08149 | 0.8419 | 0.3745 | 1.0139 | 12.18 | 1.9947 |
| 2.0 | 2.7 | 0.494 | 0.11467 | 0.6476 | 0.1688 | 1.0482 | 9.06 | 2.4181 |
| | 2.8 | 0.497 | 0.11505 | 0.6536 | 0.1752 | 1.0525 | 9.06 | 2.4124 |
| | 2.9 | 0.500 | 0.11529 | 0.6594 | 0.1815 | 1.0564 | 9.08 | 2.4062 |
| | 3.0 | 0.503 | 0.11537 | 0.6652 | 0.1876 | 1.0602 | 9.10 | 2.3998 |
| | 3.1 | 0.506 | 0.11537 | 0.6710 | 0.1936 | 1.0636 | 9.12 | 2.3931 |
| 4.0 | 2.5 | 0493 | 0.13234 | 0.5895 | 0.0751 | 1.0620 | 8.00 | 2.5802 |
| | 2.6 | 0.497 | 0.13300 | 0.5928 | 0.0787 | 1.0679 | 8.00 | 2.5831 |
| | 2.7 | 0.500 | 0.13342 | 0.5961 | 0.0822 | 1.0735 | 8.01 | 2.5878 |
| | 2.8 | 0.503 | 0.13364 | 0.5992 | 0.0856 | 1.0787 | 8.04 | 2.5868 |
| | 2.9 | 0.506 | 1.3370 | 0.6023 | 0.0890 | 1.0836 | 8.07 | 2.5852 |

As is evident from Table 8, the design of centrally pivoted pads are feasible using quadratic surface profiles for a wide range of $L_z/L_x$ ratios.

Characteristics of a centrally pivoted square shoe bearing with a convex surface profile for Type 1 and Type 2 boundary conditions are reproduced in tabular form from FIGS. 7, 8, 9, and 10 of reference [38] in Table 9.

TABLE 9

Performance coefficient $K_p$ for a centrally pivoted square shoe bearing with a convex surface profile (Reference [38]).

| Type 1 Boundary Condition | | | Type 2 Boundary Condition | |
|---|---|---|---|---|
| $h_1/h_2$ | $\delta/h_0$ | $K_p$ | $\delta h_0$ | $K_p$ |
| 4.0 | 2.08 | 0.0546 | 3.0 | 0.0495 |
| 3.0 | 1.12 | 0.0716 | 1.0 | 0.0771 |
| 2.0 | 0.35 | 0.0676 | 0.5 | 0.0716 |

Once again, as observed in the case of an infinitely wide bearing, the quadratic surface profile offers a better load carrying capacity as compared to a convex surface profile where performance is very sensitive to maintaining in practice the optimum value range of $\delta/h_0$.

For a range of $l_z/L_x$ ratios, Table 10 shows a comparative view of $K_p$'s for centrally pivoted shoes with quadratic surface profiles and an optimum conventional flat shoe with an offset pivot. It should be observed from Table 10 that the embodiment of the present invention which includes a quadratic surface 26, not only has a capability of attaining reversibility of operation, but also provides a gain of 35.62% in load carrying capacity over the conventional optimum flat surface design for $L_z/L_x$ ratio of 0.25.

Figure 13:
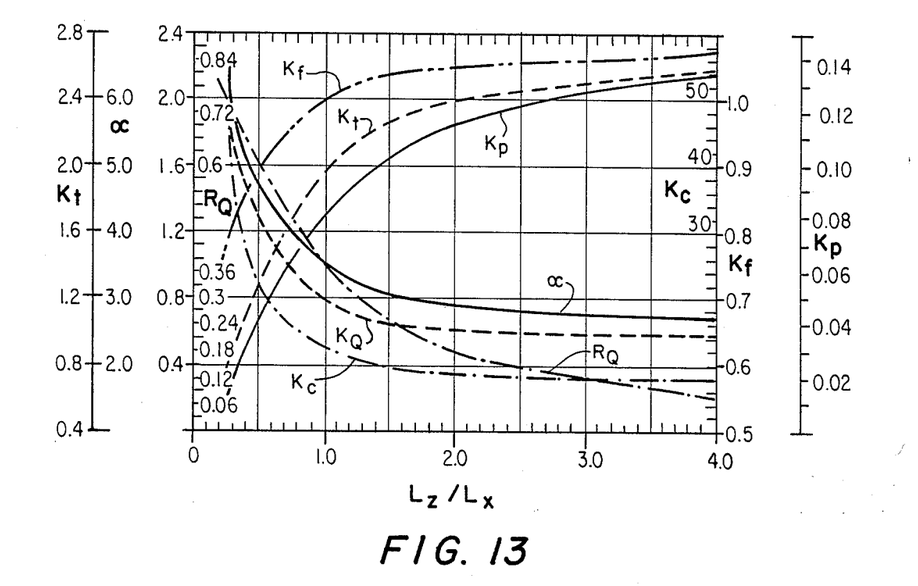
FIG. 13 is a chart of the optimum performance coefficients for a centrally pivoted shoe bearing having a quadratic surface profile.

The design chart in FIG. 13 has been developed for the analysis and design of a centrally pivoted shoe bearing 10. Because the location of pivot 19 is fixed at the center for this embodiment, there are only 5 independent design variables, $h_0$, $L_x$, $L_z$, U and $\mu$, which affect the load carrying capacity and other characteristics of centrally pivoted shoe bearing 10. Six nondimensional performance coefficients are applicable: load coefficient, $K_p$; flow coefficient, $K_Q$; side flow ratio coefficient, $R_Q$; friction force coefficient, $K_f$; the coefficient of friction coefficient, $K_c$; and temperature rise coefficient, $K_T$. $K_{\bar{x}}$ is inapplicable.

The following examples illustrate the use of the design chart given in FIG. 13.

EXAMPLE 3

Centrally pivoted shoe 18, capable of attaining reversibility of operation, is to be designed having an $L_z/L_x=0.5$ in order to carry a load of 3500 lbf (15568.7N) and experience a minimum film thickness of 0.002 in. (0.0508 mm) for slider velocity U of 1200 in./sec. The same lubricant 28 as in Examples 1 and 2 will be used.

Using FIG. 13, for $R_t=0.5$: $\alpha=4.7$, $K_p=0.03874$, $K_Q=1.3014$, $R_Q=0.6082$, $K_f=0.9058$, $K_c=22.06$ and $K_T=1.1389$.

As in Example 1, the coefficient of viscosity $\mu$ at inlet temperature 120° F. is calculated to be $4.5579 \times 10^{-6}$ lbf-S/in². Substituting $L_z = R_t L_x$ in equation (3), $$L_x = \left[ \frac{W h_o^2}{\mu U R_t K_p} \right]^{\frac{1}{3}}$$

$$= \left[ \frac{3500 \times (0.002)^2}{4.5579 \times 10^{-6} \times 1200 \times 0.5 \times 0.3974} \right]^{\frac{1}{3}}$$

$$= 5.0504 \text{ in } (128.28 \text{ mm})$$

As in Example 1, $\Delta T$ must be balanced such that the average film temperature, as determined from viscous losses, coincides with the temperature-viscosity property of the given lubricant 28. Repeating the heat balance loop for six iterations, the final value of $\mu$ at average temperature 140.75° F. is $2.9031 \times 10^{-6}$ lbf-S/in². From equations (1) to (9), $L_z = 2.9259$ in. (74.318 mm)
$Q_T = 9.1386$ in.³/sec (149.755 cm³/S)
$Q_z = 5.5581$ in.³/sec (91.08 cm³/S)
frictional horsepower = 4.9573 horsepower (3696.66 W)
$f = 0.0075$
$\Delta T = 41.5249°$ F. (5.29° C.)

The quadratic surface 26 is obtained by machining a conventional flat surface shoe 18 with the calculated dimensions of $L_z$ and $L_x$ such that surface 24 is defined by the quadratic surface equation given above for $\alpha = 4.7$.

EXAMPLE 4

Centrally pivoted shoe 18 whose dimensions are given as $L_x = 12$ in. (304.8 mm) and $L_z = 9.00$ in. (228.6 mm) is to employ the same lubricant 28 as used in Examples 1, 2 and 3 and a thrust collar 24 velocity of 500 in/sec (12.7 m/sec). Shoe 18 has a load carrying capacity of 12000 lbf (53378.4N).

To design such a shoe 18, the minimum film thickness $h_O$ must be determined, balancing $\Delta T$. For $R_t = 9/12 = 0.75$ from FIG. 13, the properties of shoe 18 are: $\alpha = 3.78$, $K_p = 0.06292$, $K_Q = 0.975$, $R_Q = 0.4444$, $K_f = 0.965$, $K_c = 15.00$, $K_T = 1.7292$.

As in Example 2, $$h_O = \left[ \frac{\mu U L_x^2 L_z K_p}{W} \right]^{\frac{1}{3}}$$

$$= \left[ \frac{4.5579 \times 10^{-6} \times 500 \times 12^2 \times 9 \times 0.06292}{1200} \right]^{\frac{1}{3}}$$

$$= \frac{0.003935 \text{ in.}}{(0.09995 \text{ mm})}$$

As in Example 2, the value of $\Delta T$ must be balanced. Thus, $$\Delta T = \frac{4.5579 \times 10^{-6} \times 500 \times 12 \times 1.7292}{(0.003935)^2 \times 778 \times 12 \times 0.0035 \times 0.5} = 18.6927° \text{ F.}$$

and average temperature $T_{avg} = 129.3464°$ F. (54.0183° C.)

At this temperature, $\mu = 3.7051 \times 10^{-6}$, and $h_O = 0.003548$ in. (0.0901 mm)

$\Delta T = 18.6907°$ F.

$T_{avg} = 129.3453°$ F. (54.0807° C.)

Hence, using equations (1–9):
$Q_T = 15.5669$ in³/sec (255.096 cm³/S)
$Q_z = 6.9179$ in³/sec (113.364 cm³/S)
frictional horsepower = 4.1225 horsepower (3074.148 W) and
$f = 0.0044$ It will be appreciated that the thrust bearing shoe of the present invention is not limited to oil lubricated thrust bearings; it is applicable as well to gas bearings. The present invention may also be used in fixed shoe bearings where the shoes have fixed inclinations.

The bearings of the present invention have several advantages over prior art flat surface shoe bearings:

1. The load carrying capacity of the pivoted shoe thrust bearing constructed in accordance with the present invention is considerably higher than that of prior art bearings.

2. For the same value of minimum film thickness, the improved load carrying capacity of the present invention increases the margin of safety.

3. The load carrying capacity of a thrust bearing is directly proportional to the speed. Therefore the high load capacity at low rotor speeds of the present invention increases the range of applications for which these bearings are applicable. Longer bearing life is achieved where load capacities are generated at a lower speed.

4. For equal load carrying capacities, the bearings of the present invention need lesser shoe area as compared to prior art and thereby reduce the size and space required for the bearing. Reduction in size and space ultimately reduces the material cost.

5. The improved load carrying capacity of the present invention leads to better stiffness charcteristics, thereby improving dynamic stability.

6. The embodiments which incorporate a quadratic surface profile provide a unique opportunity to attain reversibility of operation with an improved load carrying capacity as compared to prior art bearings.

While only certain embodiments of the present invention have been described in detail herein and shown in the accompanying Drawings, it will be evident that various further modifications are possible without departing from the scope of the invention.

I claim:

1. A thrust bearing support for a moving body, said bearing support having a thrust surface and comprising:
   a. a bearing shoe tilted relative to said thrust surface for spaced apart motion relative to said thrust surface;
   b. an optimized curved one-dimensional convex profile shape on said shoe as viewed perpendicular to the direction of relative motion, said profile shape being designed for maximum load carrying capacity in accordance with the ratio of width to length of said bearing shoe surface; and
   c. A lubricant adapted to form a film over said shoe surface and said thrust surface to space them apart upon relative motion therebetween.

2. A thrust bearing support for a moving body, said bearing support having a thrust surface and comprising:
   a. bearing shoes having bearing surfaces facing said thrust surface, each of said bearing surfaces being tilted relative to said thrust surface, said bearing surfaces designed with curved one-dimensional convex profile shapes which optimize performance characteristics according to the ratio of shoe width $L_z$ to shoe length $L_x$; and
   b. means for confining a fluid lubricant to form films on said bearing surfaces and said thrust surface to maintain them spaced apart during relative motion thereof.

3. A bearing shoe for being disposed in a lubricant between first and second surfaces undergoing relative motion comprising:
   a leading edge on said bearing shoe spaced a first distance, $h_1$, from said second surface and a trailing edge spaced a second distance, $h_o$, from said second surface, which second distance, $h_o$, is less than said first distance, $h_1$; and
   an optimum curved one-dimensional convex profile shaped bearing shoe surface between said leading and trailing edges for forming a lubrication film between said shoe surface and said second surface, which film has a maximum load carrying capactiy for a predetermined width $L_z$ to length $L_x$ ratio of said shoe surface.

4. The bearing of claim 3 wherein:
   a. said predetermined ratio of shoe width $L_z$ to shoe length $L_x$ is greater than 2,
   b. said optimum curved one-dimensional profile is cycloidal, according to the relation:

$$t = h_o[(\alpha-1)\sin(2\pi x/L_x)]/2\pi);$$

where t is the height of said shoe surface at a point x measured from said leading edge of said shoe surface along the direction of relative motion, $h_o$ is the desired minimum thickness of said film, and $\alpha$ is the optimum ratio of maximum $h_1$ to minimum $h_o$ thickness of said film for maximum load carrying capacity with said cycloidal shaped bearing surface.

5. The bearing of claim 3 wherein:
   a. the ratio of shoe width $L_z$ to shoe length $L_x$ is less than or equal to about 1, and
   b. said optimum curved profile is a truncated cycloidal profile, being defined by the relation:

$$t = h_o[(\alpha-1)\sin(\pi x/L_x)]/\pi;$$

where t is the height of said shoe surface at a point x measured from said leading edge of said shoe surface along the direction of relative motion, $h_o$ is the desired minimum thickness of said film, and $\alpha$ is the optimum ratio of maximum $h_1$ to minimum $h_o$ thickness of said film for maximum load carrying capacity with said truncated cycloidal shaped bearing surface.

6. The bearing of claim 3 wherein:
   a. the ratio of shoe width $L_z$ to shoe length $L_x$ is less than or equal to about 0.5, and
   b. said optimum curved profile is cubic, being defined by the relation:

$$t = h_o(\alpha-1)[(x/L_x)-(x/L_x)^3];$$

where t is the height of said shoe surface at a point x measured from said leading edge of said shoe surface along the direction of relative motion, $h_o$ is the desired minimum thickness of said film, and $\alpha$ is the optimum ratio of maximum $h_1$ to minimum $h_o$ thickness of said film for maximum load carrying capacity with said cubic shaped bearing surface.

7. The bearing of claims 5 or 6 wherein said bearing shoe is pivotally restrained by said first surface at an optimum pivot point corresponding to said optimum ratio of maximum to minimum film thickness.

8. The bearing of claim 3 wherein:
   a. said bearing shoe is pivotally attached to said first surface at a central pivot location, and
   b. said optimum curved profile is quadratic, being defined by the relation:

$$t = h_o(\alpha-1)[(x/L_x)-(x/L_x)^4];$$

where t is the height of said shoe surface at a point x measured from said leading edge of said shoe surface along the direction of relative motion, $h_o$ is the desired minimum thickness of said film, and $\alpha$ is the optimum ratio of maximum $h_1$ to minimum $h_o$ thickness of said film.

9. The method of manufacture of a thrust bearing having a thrust surface for support of a moving body and comprising the step of:
   machining a bearing shoe surface to have a curved one-dimensional profile shape, said profile shape designed for maximum load carrying capacity in accordance with the ratio between shoe width $L_z$ to shoe length $L_x$ in accordance with the optimum shape defined by the appropriate one of the equations for the ratio $L_z/L_x$:
   (A) Cycloidal surface profile if $L_z/L_x$ is greater than 2:

$$t = h_o[(\alpha-1)\sin(2\pi x/L_x)]/(2\pi)$$

(B) Truncated cycloidal surface profile if $L_z/L_x$ is greater than 0.5 and less than or approximately equal to 1:

$$t = h_o[(\alpha-1)\sin(\pi x/L_x)]/\pi$$

(C) Quadradic surface profile if $L_z/L_x$ is less than or approximately equal to 0.5:

$$t = h_o(\alpha-1)[(x/L_x)-(x/L_x)^4]$$

where t is the height of said shoe surface at a point x measured from said leading edge of said shoe surface along the direction of relative motion, $h_O$ is the desired minimum thickness of said lubricant film, and $\alpha$ is the optimum ratio of maximum $h_1$ to minimum $h_O$ thickness of said film for maximum load carrying capacity for the appropriate optimum surface profile.

* * * * *